United States Patent Office 3,320,072
Patented May 16, 1967

3,320,072
INFANT'S FORMULA MADE WITH ELECTRO-DIALYZED MILK
Robert E. Clark, Lansing, and Elbert R. Spence and Rexford C. Stribley, Mason, Mich., assignors to American Home Products Corporation, New York, N.Y., a corporation of Delaware
No Drawing. Filed Dec. 13, 1963, Ser. No. 330,231
5 Claims. (Cl. 99—63)

This invention relates to infant's food products and to a novel process for making the same. More particularly the invention relates to simulated milk compositions substantially identical to human milk prepared from electrodialyzed bovine milk.

For many years a continuing effort has been directed to producing a substitute for human milk from cow's milk. A major obstacle to the successful production of such a product has been the inability to reduce the ash content of the cow's milk to be used in the simulated human milk composition without adversely affecting the other components of the milk essential to maintaining overall nutritive value in the final product.

One of the techniques used in processing cow's milk in attempting to simulate human milk product is the ion-exchange desalting method in which cow's milk is processed through beds of ion exchange resins. This technique is costly to operate and difficult to maintain under proper sanitary conditions. More importantly however, such technique does not properly adjust the anion content of the milk, to the lever necessary for a human milk substitute. For example, the phosphates, which are undesirably high in cow's milk, are not adequately removed by the technique described. While the technique does affect a degree of ash reduction, certain components are removed disproportionately, thus adversely affecting the essential balance of such components in the final product. This technique, moreover, results in a product having its protein content altered in a manner that results in heat instability when sterilization is carried out on a final product incorporating the desalted milk.

A number of attempts have been made to construct or more particularly compound simulated human milk from individual purified ingredients that is, precipitated washed casein, precipitated washed whey proteins, lactose, fats, vitamins and minerals. It is well known to those skilled in the art that such a procedure is very costly. Furthermore the desirable water soluble components such as B vitamins and non-protein nitrogen components are lost in the protein preparation according to such techniques. In addition the purified proteins cannot be properly resolubilized in the formula to give an uncoagulated feeding preparation like breast milk.

It is, of course, well known that the mineral components of milk, in proper balance, are essential in insuring growth and the proper functioning of the infant. For example, an excess of minerals which must be excreted in the urine imposes an undue burden on the organs of the infant responsible for this function. Accordingly, it is essential that any combination serving as a substitute for human milk provide the proper balance of all the components of human milk.

The difficulties faced in producing a simulated human milk from bovine milk will be more readily understood if attention is given to Table I in which representative compositions of bovin and human milk are set forth.

TABLE I
[Composition of bovine and human milks (dry basis)]

|  | Bovine | Human |
| --- | --- | --- |
| Total protein, g./100 g | 26.8 | 12.3 |
| Casein, g./100 g | 22.0 | 5.0 |
| Whey protein, g./100 g | 4.8 | 7.3 |
| Lactose, g./100 g | 38.9 | 57.4 |
| Fat, g./100 g | 28.6 | 28.6 |
| Calcium, mg./100 g | 1,000 | 264 |
| Phosphorus, mg./100 g | 790 | 123 |
| Potassium, mg./100 g | 1,130 | 450 |
| Sodium, mg./100 g | 476 | 123 |
| Chloride, mg./100 g | 846 | 352 |
| Magnesium, mg./100 g | 99 | 33 |
| Total ash, gm./100 g | 5.7 | 1.7 |
| Calories/100 g | 540.0 | 540.0 |

It will be observed from the table that human milk is richer than bovine in whey protein and lactose, has the same fat content and the same caloric value as bovine milk but has a relatively lower content of all other constituents shown. Processing bovine milk in an economical manner directly to a product having the composition of human milk on reconstitution in the same weight amounts has been a most difficult problem.

To further illustrate the difficulty in producing a simulated human milk from bovine milk a composition was prepared with bovine milk processed according to presently available techniques of dilution, removal of all butter fat and adding back of a fat blend, vitamins and trace minerals as necessary. A comparison of such a product and human milk is set forth in Table II.

TABLE II
[Preparation of 100 g. of a Simulated Human Milk Formula on a Bovine Milk Basis]

| A | G. | Fat, g. | Protein, g. | Lactose, g. | Ca, mg. | P, mg. | Na, mg. | K, mg. | Cl, mg. | Mg, mg. | Ash, g. | B Casein, g. | C Whey Proteins, g. |
| --- | --- | --- | --- | --- | --- | --- | --- | --- | --- | --- | --- | --- | --- |
| Non-fat bovine milk | 33.0 | 0.3 | 12.3 | 17.8 | 458 | 362 | 218 | 518 | 388 | 45 | 2.61 | 10.0 | 2.3 |
| Fat | 27.9 | 27.9 |  |  |  |  |  |  |  |  |  |  |  |
| Lactose | 39.1 |  |  | 39.1 |  |  |  |  |  |  |  |  |  |
| Totals | 100 | 28.2 | 12.3 | 56.9 | 458 | 362 | 218 | 518 | 388 | 45 | 2.61 | 10.0 | 2.3 |
| Human milk | 100 | 28.6 | 12.3 | 57.4 | 264 | 123 | 123 | 450 | 352 | 33 | 1.70 | 5.0 | 7.3 |

In the foregoing table, Column A identifies the ingredients while subsequent columns report the amounts present. In the bottom horizontal line, the composition of human milk is shown and is to be compared with the totals for the simulated product immediately above. It will be noted that the amounts of fat, protein and carbohydrate have been closely matched to human milk. However, the composition and amounts of the component proteins present (Columns B and C) differs substantially. The simulated formula contains twice as much casein but less than ½ as much whey protein. Additionally, the content of all inorganic elements of the simulated formula is too high, particularly the phosphorus content which as is readily apparent is three times the amount of phosphorus normally present in human milk.

A number of high significant and practicable improvements can be made in the formula illustrated in Table II by the use of electrodialyzed whey according to, for example, U.S. 2,604,403. Electrodialyzed whey provides n economical source of essentially whey proteins, lactose and water soluble vitamins from cow milk. The ingredients and composition of a simulated human milk prepared according to U.S. 2,604,403 is shown in Table III.

dialyzed whey desalted so that the ash of whey is about 10% that of normal whey, edible lactose and edible fat provides quite unexpectedly a satisfactory simulated human milk product. Such a product is characterized in

TABLE III

[Preparation of 100 g. of Simulated Human Milk Formula on an Electrodialyzed Whey and Non Fat Mix Basis (All Values in Grams)]

| | Weight, g. | Fat g. | Protein, g. | Lactose, g. | Ca, mg. | P, mg. | Na, mg. | K, mg. | Cl, mg. | Mg, mg. | Ash, g. | Casein, g. | Whey Protein, g. |
|---|---|---|---|---|---|---|---|---|---|---|---|---|---|
| Non fat Milk solids | 16.52 | 0.13 | 6.15 | 8.93 | 229 | 181 | 109 | 259 | 194 | 23 | 1.31 | 5.0 | 1.15 |
| Electrodialyzed Whey | 42.4 | | 6.15 | 35.79 | 51 | 55 | 4 | 127 | 13 | 4 | 0.467 | | 6.15 |
| Fat | 28.47 | 28.47 | | | | | | | | | 0.013 | | |
| Edible Lactose | 12.67 | | | 12.68 | | | | | | | | | |
| KCl | 0.112 | | | | | | | 64 | 58 | | 0.068 | | |
| CaCl₂ | 0.094 | | | | 31 | | | | 55 | | 0.043 | | |
| NaCl₂ | 0.025 | | | | | | 10 | | 15 | | 0.013 | | |
| MgCl₂ | 0.023 | | | | | | | | 17 | 6 | 0.010 | | |
| Totals | 100 | 28.6 | 12.3 | 57.4 | 311 | 236 | 123 | 450 | 352 | 33 | 1.924 | 5.0 | 7.3 |
| Human Milk | 100 | 28.6 | 12.3 | 57.4 | 264 | 123 | 123 | 450 | 352 | 33 | 1.700 | 5.0 | 7.3 |

It will be noted that in this composition, not only are the total amounts of fat, protein and lactose the same as human milk but, in addition, the proportions of casein and whey proteins and the quantities of the major minerals sodium, potassium, chloride and magnesium are closely matched to human milk. However, the phosphorus and calcium are still significantly higher than human milk and therefore the total mineral content of the composition, as roughly indicated by the ash, is higher than human milk as the result of this high and undesirable calcium and phosphorus content.

It will be noted also that, using cow milk and electrodialyzed whey in the correct proportions to give the same total protein, casein and whey proteins as human milk, the phosphorus cannot be reduced to human milk level. This is true even if the electrodialyzed whey is prepared in such a way as to supply no phosphorus. Actual experience has shown that practical methods of electrodialysis yield a product containing about 0.14% dry basis of phosphorus and that exhaustive desalting by dialysis leaves about 0.065% dry basis, of bound phosphorus unavailable in ionized removable form.

The amounts of calcium and phosphorus are of major importance in infant nutrition. Too large a quantity of phosphorus in relation to the amount of calcium makes the calcium less available for absorption in the gut. Levels of these two minerals above human milk as a substitute formula even though the ratio "calcium to phosphorus" is adjusted by addition of calcium to the about two to one of breast milk, places an unnecessary and highly undesirable load upon the infant kidney and is not needed for proper nutrition when the formula is otherwise a close simulation of breast milk. The addition of sufficient calcium to a simulated human milk such as that shown in Table III to achieve the correct calcium to phosphorus ratio, would be somewhat beneficial but such a preparation is highly unstable to the heating processes required to make the formula of acceptable sanitary quality and one which has normal shelf life.

It is therefore the object of the invention to provide an infant feeding formula which, while retaining the closeness to the composition of human milk attainable by prior art and as illustrated in Table III, has the hitherto unattainable duplication of the calcium and phosphorus ratio and total content of breast milk.

This and other objects are accomplished, according to the method and improved composition of the present invention, by utilizing in the preparation of a simulated human milk, electrodialyzed whey and bovine milk which has been subjected to electrodialysis under precisely controlled, critical conditions. It has been found that if bovine milk is subjected to electrodialysis in a manner that reduces the ash content to an amount approximately 30 per cent to 50 percent that of normal non-fat bovine milk, the product when having added thereto, electrohaving a reduced total mineral content substantially consistent with the mineral content of human milk, an ash content on a reconstituted basis of from 0.21 to not more than 0.27 percent, clearly consistent to the total ash content of human milk and a whey protein to casein ratio substantially similar to that of human milk. The product will also have a whey protein to casein ratio of about 1.46:1 and a substantially correct protein to phosphorus ratio when compared to human milk. Additionally and importantly, such a product has the advantage of being heat stable during the required high temperature sterilization processing.

In preparing the simulated milk compositions of the present invention utilizing electrodialyzed milk, it is necessary as suggested above, that minor amounts of edible lactose and fats be added in preparing the final composition. The edible fats suitable for this purpose include the animal and vegetable fats as well as blends of the same. The fats used are preferably low in $C_4$, $C_6$ and $C_{12}$–$C_{14}$ saturated fatty acids. They are additionally low in stearic acid and preferably contain a substantial portion of unsaturated fatty acids. A fat blend suitable for the defined purpose comprises a major amount of an oil such as oleo oil together with lesser amounts of coconut oil, corn oil or soya bean oil and the like. A typical blend suitable for purposes of the present invention is represented by the following: oleo oil 50–65 percent, coconut oil 15–25 percent, corn oil 5–15 percent, soya bean oil 15–20 percent.

Though the present invention encompasses the use of electrodialyzed milk, the invention is more specifically and preferably directed to a simulated milk product of the type and composition described utilizing a substantial portion of electrodialyzed skim milk the ash content of which has been reduced to 30 to 50 percent that of normal skim milk and preferably to 34 to 45 percent of normal skim milk. The use of such a milk for the purposes described herein has not previously been possible according to known technique without substantial reconstitution, an undesirable procedure from the point of view of the final composition as previously described. As previously indicated, it is necessary that the ash of whey be reduced to not more than 10 percent that of normal whey. This will bring the phosphorus level to about 0.14% (dry basis). It is preferred however that the phosphorus level be less than 0.1%, therefore the degree of whey desalting preferred is that which reduces the ash of whey to the range of 2 to 4 percent that of normal whey.

In addition to the essential and important components above-identified for the simulated human milk product of the present invention, it is of course understood that trace amounts of minerals and/or vitamins can be added to provide the final composition with these elements as desired, for example, metals such as ferrous iron, copper, potassium, sodium and calcium in their salt forms such as the citrate, chloride or bicarbonate may be used. The most important of the foregoing will be the calcium salt the addition of which may be necessary to meet a specification standard, that is to provide a desired calcium phosphorus ratio when a particular batch of the electrodialyzed milk being used is deficient in calcium. This of course can occur when slight variations in the electrodialysis processing occur. While the continuous sampling of the dialysis product will minimize operating conditions which temporarily exceed predetermined standards for a specified product, variations are readily corrected by addition of these salts as suggested.

The electrodialyzed milk and electrodialyzed whey supply significant quantities of the B vitamins which substantially reduces the cost of the added vitamins. In the preparation of the formula, vitamin levels are then further adjusted by addition of vitamins to the formula as necessary to provide the required levels. Such levels are recommended for a daily allowance basis by the National Research Council.

In order to obtain this desired composition, in all its critical aspects, it is necessary as has been previously suggested that the skim milk and as well as the whey, be subjected to controlled electrodialysis. In accomplishing this, known electrodialysis technique of the type described in U.S. 2,631,100 and U.S. 2,671,055 is used. In describing this method hereinafter, whey is used as the typical feed material for convenience of description it being recognized that the non-fat milk from bovine, goat or other milk source, useable herein is also processed according to the same technique for the purposes of the present invention.

The infant feeding composition of this invention comprises in its broadest aspect as described above, electrodialyzed whey (EDW) and electrodialyzed skim milk (ED skim), edible lactose and an edible fat blend. A typical composition of this type in which the identified ingredients are set forth on a weight basis is as follows: fat blend, 1.0 part; lactose, 0.45 parts; electrodialyzed skim milk, 0.56 part and electrodialyzed whey, 1.5 parts. As will be apparent from the examples and tables which follow, Ca is present in the final composition by reason of the specific treatment of the electrodialyzed whey and electrodialyzed skim milk in an amount of from 140–160 mg./100 g. of formula solids. Phosphorus however is present in an amount of from 117–130 mg./100 g. substantially identical with human milk. The addition therefore of only 100–130 mg./100 g. Ca provides quite unexpectedly the same Ca/P ratio as in human milk, a result not previously obtainable by prior techniques.

The fat blend would typically consist of the following: oleo oil 55%, coconut oil 17.5%, corn oil 10.0%, soybean oil 16.5% and soybean lecithin 1.0%. To the foregoing mixture, there is then normally added the critical and required minerals such as ferrous iron, copper, calcium, potassium and sodium, preferably in the salt form and totalling in the composition described, in the same part weight ratio basis not more than 0.0015 part. The amounts required are set forth in Table VI. Finally there is added to the composition the vitamins identified below, which are on the basis of a reconstituted liquid quart (2.1 pounds containing 12.4% total solids):

Vitamin A _____U.S.P. units__ 2500
Vitamin D _____U.S.P. units__ 400
Vitamin E _____I.U.__ 6
$B_2$ (thiamine hydrochloride) _____mg.__ 0.67
$B_3$ (riboflavin) _____mg.__ 1
C (ascorbic acid) _____mg.__ 50
$B_6$ (pyridoxine hydrochloride) _____mg.__ 0.4
$B_{12}$ (cyancobalamin) _____mcg.__ 1
Niacinamide _____mg.__ 5

A better understanding of the manner in which the ED skim milk and ED whey of the present invention are prepared and the manner in which they are utilized for the purposes of the present invention will be obtained by referring to the examples and tables which follow:

EXAMPLE I

*Partial desalting of non-fat milk by electrodialysis*

The equipment used in providing the desired electrodialyzed non-fat milk was an electrodialysis stack consisting of 20 cell pairs (one desalting cell and one concentrating cell comprise a cell pair) 9″ x 10″ and approximately 1 mm. thick together with standard electrodes and ends plates. The dialysis membranes used where the homogeneous, permselective type designated as Ionics CR 61, carton permeable, and AR–111A anion permeable. The stack is provided with a suitable source of direct current, and is equipped with flow, pH, conductivity, and electrical meters, as well as appropriate gauges, pumps, piping and tanks.

In carrying out electrodialysis 45 pounds of raw skim milk was heated to 165° F., held for 30 seconds, and cooled to 120° F. The milk circuit of the dialysis stack was standardized by pumping 100 p.p.m. chlorine solution through the stack before use. The chlorine solution was rinsed out with distilled water and the stack filled with water. Prior to initiation of dialysis, a sample of the skim milk in the stack was analyzed as shown hereafter. The brine solution used was prepared from 32 gallons of water heated to 120° F. to which 175 gms. NaCl and 80 ml. concentrated HCl were added. The electrode rinse solution was prepared from 5 gallons of water heated to 120° F. to which was added 165 gms. $K_2SO_4$ and 35 ml. concentrated $H_2SO_4$. A starting current of 0.4 amp was delivered to the stack. During operation, samples were removed at 30 minute intervals for solids and ash determination. The pH gradient across the stack was held between 0.1 and 0.2 pH units. The average gradient across the stack for the run was −0.19 pH units. The composite milk averaged 0.0023 pH units drop per minute of operation. The run was stopped after 2:45 hours at which time the milk had a pH 6.12.

The dialyzed milk, after being diluted with rinse water, had 7.29 percent solids and 0.4498 percent nitrogen (protein/solids—39.369%).

Analyses of the milk before and after dialysis follows:

TABLE IV

| | Starting Milk (In the stack) | Dialyzed Milk, Final |
| --- | --- | --- |
| Density (25° C.) | 1.0256 | 1.0235 |
| pH (25° C.) | 6.70 | 6.20 |
| Percent Solids | 7.79 | 7.76 |
| Composition of Solids, Percent: | | |
| Total Protein | 36.93 | 38.40 |
| Casein | 30.32 | 31.53 |
| Whey Proteins | 6.61 | 6.87 |
| Ash | 8.09 | 2.75 |
| Calcium | 1.7625 | 0.00550 |
| Magnesium | 0.18 | 0.00055 |
| Phosphorus | 0.1121 | 0.425 |
| Sodium | 0.661 | 0.005 |
| Potassium | 1.57 | 0.005 |
| Chloride | 1.175 | 0.33 |

Commerically prepared electrodialyzed whey powder having the following composition was used. The fluidized electrodialyzed whey was neutralized to pH 6.8 with KOH after electrodialysis.

TABLE V

Composition of EDW solids: Percent
Total Proteins _____ 14.5
Casein _____ 0
Whey Proteins _____ 14.5
Lactose _____ 84.4
Ash _____ 1.1

Composition of EDW solids: Percent
- Calcium — 0.12
- Phosphorus — 0.13
- Sodium — 0.01
- Potassium — 0.3
- Chloride — 0.03
- Magnesium — 0.01

The electrodialyzed whey (Table V), electrodialyzed skim milk (Table IV), lactose and fats were combined to give 10 lbs. of total solids at 25% T.S. The mix was agitated and heated to 160° F. The minerals were then added. The formula was clarified, high-temperature-short-time pasteurized (180° F., 10 seconds), cooled and spray dryed. The resulting formula had the composition on a solids basis as given in Table VI.

TABLE VI

[Preparation of 100 g. of simulated human milk formula on an electrodialyzed whey and electrodialyzed non-fat milk basis (all values in grams)]

| | Weight, g. | Fat, g. | Protein, g. | Lactose, g. | Ca, mg. | P, mg. | Na, mg. | K, mg. | Cl, mg. | Mg, mg. | Ash, g. | Casein, g. | Whey Protein, g. |
|---|---|---|---|---|---|---|---|---|---|---|---|---|---|
| Electrodialyzed Non-Fat Milk | 16.0 | 0.1 | 6.15 | 8.9 | 88 | 68 | 8 | 8 | 53 | 9 | 0.440 | 5.0 | 1.15 |
| Electrodialyzed Whey | 42.4 | | 6.15 | 35.8 | 51 | 55 | 4 | 127 | 13 | 5 | 0.466 | | 6.15 |
| Fat | 28.5 | 28.5 | | | | | | | | | 0.013 | | |
| Edible Lactose | 12.7 | | | 12.7 | | | | | | | 0.028 | | |
| Calcium Citrate | 0.095 | | | | 20 | | | | | | 0.133 | | |
| KCl | 0.210 | | | | | | | 110 | 100 | | 0.241 | | |
| KHCO₃ | 0.513 | | | | | | | 200 | | | 0.147 | | |
| CaCl₂ | 0.291 | | | | 105 | | | | 186 | | 0.150 | | |
| NaOH | 0.193 | | | | | | 111 | | | | 0.032 | | |
| MgO | 0.032 | | | | | | | | | 19 | | | |
| Totals | 100 | 28.6 | 12.3 | 57.4 | 264 | 123 | 123 | 445 | 352 | 33 | 1.65 | 5.0 | 7.3 |
| Human Milk | 100 | 28.6 | 12.3 | 57.4 | 264 | 123 | 123 | 445 | 352 | 33 | 1.70 | 5.0 | 7.3 |

EXAMPLE II

Twenty-five pounds of skim milk containing 2.085 lbs. T.S. was electrodialyzed in a similar manner and in similar equipment as that used in Example I. The skim milk was deashed 55% at 890 ohms in 71 minutes. The processing rate was 4.0 lbs. input solids/meter²/hour. Following is the analysis of the starting and final samples.

TABLE VII

| | Starting Milk | Dialyzed Milk |
|---|---|---|
| pH | 6.7 | 6.47 |
| Percent T.S. | 7.92 | 7.91 |
| Composition of Solids, percent: | | |
| Protein (81.3% casein, 12.7% Whey Proteins) | 37.52 | 38.65 |
| Ash | 8.22 | 3.70 |
| Calcium | 1.790 | 0.833 |
| Magnesium | 0.18 | 0.08 |
| Phosphorus | 0.1139 | 0.601 |
| Sodium | 0.672 | 0.04 |
| Potassium | 1.595 | 0.04 |
| Chloride | 1.175 | 0.414 |

Commercially prepared electrodialyzed whey which had been exhaustively dialyzed to 5000 ohms was obtained. The analysis of the electrodialyzed whey on a solids basis is given in Table VIII.

TABLE VIII

Composition of EDW solids: Percent
- Total Proteins — 14.5
- Casein — 0
- Whey Proteins — 14.6
- Lactose — 84.6
- Ash — 0.2
- Calcium — 0.05
- Phosphorus — 0.065
- Sodium — 0.001
- Potassium — 0.001
- Chloride — 0.001
- Magnesium — 0.005

Using the electrodialyzed milk shown in Table VII and the electrodialyzed whey shown in Table VIII a food composition was prepared in the same manner as in Example I. The composition of the formula is shown in Table IX.

TABLE IX.—EXAMPLE II

[Preparation of 100 g. of simulated human milk on an electrodialyzed whey and an electrodialyzed non-fat milk basis (All values in Grams (g.), Milligrams (mg.))]

| | Weight, g. | Fat, g. | Protein, g. | Lactose, g. | Ca, mg. | P, mg. | Na, mg. | K, mg. | Cl, mg. | Mg, mg. | Ash, g. | Casein, g. | Whey Protein, g. |
|---|---|---|---|---|---|---|---|---|---|---|---|---|---|
| Electrodialyzed non-fat milk | 15.9 | 0.1 | 6.15 | 8.8 | 132 | 96 | 6 | 6 | 66 | 13 | 0.588 | 5.0 | 1.15 |
| Electrodialyzed Whey | 42.1 | | 6.15 | 35.6 | 21 | 27 | | | | 2 | 0.084 | | 6.15 |
| Fat | 28.5 | 28.5 | | | | | | | | | | | |
| Edible Lactose | 13.0 | | | 13.0 | | | | | | | 0.028 | | |
| Calcium Citrate | 0.095 | | | | 20 | | | | | | 0.166 | | |
| KCl | 0.263 | | | | | | | 138 | 125 | | 0.363 | | |
| KHCO₃ | 0.772 | | | | | | | 301 | | | 0.127 | | |
| CaCl₂ | 0.252 | | | | 91 | | | | 161 | | 0.157 | | |
| NaOH | 0.203 | | | | | | 117 | | | | 0.030 | | |
| MgO | 0.030 | | | | | | | | | 18 | | | |
| Totals | 100 | 28.6 | 12.3 | 57.4 | 264 | 123 | 123 | 445 | 352 | 33 | 1.54 | 5.0 | 7.30 |
| Human Milk | 100 | 28.6 | 12.3 | 57.4 | 264 | 123 | 123 | 445 | 352 | 33 | 1.70 | 5.0 | 7.3 |

A comparison of the totals in the foregoing Tables VI and IX, with the composition of the human milk set forth in the bottom line, establishes the substantially identical composition preparable according to the present invention by using the components identified. It will be noted that the simulated milk of the present invention in all aspects conforms almost identically to the composition of human milk.

One further aspect of the present invention considered of importance and in the nature of an added advantage is the removal of strontium (Sr) ions during ash reduction by electrodialysis. The process therefore has the advantage of being able to remove the undesirable components from cow's milk and provide the simulated human milk formula of the present invention with substantially reduced strontium 90 content.

In addition to the ingredients identified in the specific example set forth above, it is of course understood that vitamins and traces of minerals may be added to the final simulated human milk formula as desired. These can be varied as it is needed to meet the particular requirements of the simulated formula.

While the foregoing invention has been described with respect to specific embodiments, it is to be understood that the same is not to be limited thereby but limited only by the claims appended hereto.

We claim:

1. A process for the preparation of a food product particularly adapted for human infant nutrition substantially approximating human milk in composition and nutritional content having an ash content of from 0.20 to 0.40 percent when reconstituted for feeding at 12.3 to 12.5 percent total solids which comprises, electrodialyzing skim milk until it contains 34 percent to 45 percent the ash content of normal skim milk, electrodialyzing whey until it contains 2 percent to 10 percent the ash content of normal whey and then admixing, on a dry solid basis, 0.56 part of said electrodialyzed skim milk, 1.5 parts of said electrodialyzed whey, 1.0 part of a blend of fats and 0.45 part of lactose, said electrodialyzed whey and electrodialyzed skim milk in combination providing, in the final product without addition of phosphorus, phosphorus in the amount of 117–130 mg./100 g. and, with the addition of not more than 100–130 mg./100 g. of calcium, calcium in the amount of 250–280 mg./100 g. of product solids and a whey protein to casein ratio of 1.46:1.

2. A process for the preparation of a food product particularly adapted for human infant nutrition substantially approximating human milk in composition and nutritional content having an ash content of from 0.20 to 0.40 percent when reconstituted for feeding at 12.3 to 12.5 percent total solids which comprises, electrodialyzing skim milk until it contains 45 percent the ash content of normal skim milk, electrodialyzing whey until it contains 2 percent to 10 percent the ash content of normal whey and then admixing, on a dry solids basis, 0.56 part of said electrodialyzed skim milk, 1.5 part of said electrodialyzed whey, 1.0 part of a blend of fats and 0.45 part of lactose, said electrodialyzed whey and electrodialyzed skim milk in combination providing in the final product without the addition of phosphorus, phosphorus in the amount of 117–130 mg./100 g. and, with the addition of not more than 100–130 mg./100 g. of calcium, calcium in the amount of 250–280 mg./100 g. of product solids and a whey protein to casein ratio of 1.46:1.

3. A process for the preparation of a food product particularly adapted for human infant nutrition substantially approximating human milk in composition and nutritional content having an ash content of from 0.20 to 0.40 percent when reconstituted for feeding at 12.3 to 12.5 percent total solids which comprises, electrodialyzing skim milk until it contains 34 percent to 45 percent the ash content of normal skim milk, electrodialyzing whey until it contains 2 percent the ash content of normal whey and then admixing, on a dry solids basis, 0.56 part of said electrodialyzed skim milk, 1.5 part of said electrodialyzed whey, 1.0 part of a blend of fats and 0.45 part of lactose, said electrodialyzed whey and electrodialyzed skim milk in combination providing, without addition of phosphorus, phosphorus in the amount of 117–130 mg./100 g. and with the addition of not more than 100–130 mg./100 g. of calcium, calcium in the amount of 250–280 mg./100 g. of formula solids and a whey protein to casein ratio of 1.46:1.

4. A process for the preparation of a food product particularly adapted for human infant nutrition substantially approximating human milk in composition and nutritional content having an ash content of from 0.20 to 0.40 percent when reconstituted for feeding at 12.3 to 12.5 percent total solids which comprises, electrodialyzing skim milk until it contains 34 percent to 45 percent the ash content of normal skim milk, electrodialyzing whey until it contains a phosphorus level of less than 0.14 percent and then admixing, on a dry solids basis, 0.5 part of said electrodialyzed skim milk, 1.5 parts of said desalted whey, 1.5 parts of a blend of fats and 0.45 part of lactose, said electrodialyzed whey and electrodialyzed skim milk in combination providing in the final product without addition of phosphorus, phosphorus in the amount of 117–130 mg./100 g. and with the addition of not more than 100–130 mg./100 g. of calcium, calcium in the amount of 250–280 mg./100 g. of formula solids and a whey protein to casein ratio of 1.46:1.

5. A process for the preparation of a food product particularly adapted for human infant nutrition substantially approximating human milk in composition and nutritional content having an ash content of form 0.20 to 0.40 percent when reconstituted for feeding at 12.3 to 12.5 percent total solids which comprises, electrodialyzing skim milk until it contains 34 percent to 45 percent the ash content of normal skim milk, electrodialyzing whey until it contains 2 percent to 10 percent the ash content of normal whey, and admixing, on a dry solids basis, 0.56 part of said electrodialyzed skim milk, 1.5 parts of said electrodialyzed whey, 1.0 part of an edible fat blend comprising a mixture of a major amount of beef oleo oil and minor amounts of coconut oil, corn oil and soyabean oil, and 0.45 part of lactose, said electrodialyzed whey and electrodialyzed skim milk in combination providing in the final product without addition of phosphorus, phosphorus in the amount of 117–130 mg./100 g. and with the addition of not more than 100–130 mg./100 g. of calcium, calcium in the amount of 250–280 mg./100 g. of formula solids and a whey protein to casein ratio of 1.46:1.

References Cited by the Examiner

UNITED STATES PATENTS

| 1,341,040 | 5/1920 | Bowworth | 99—63 |
| 2,465,907 | 3/1949 | Meade et al. | 99—54 |
| 2,604,403 | 7/1952 | Wiechers | 99—63 X |
| 2,611,706 | 9/1952 | Bernhart et al. | 99—118 |

FOREIGN PATENTS

| 359,791 | 10/1931 | Great Britain. |
| 907,772 | 10/1962 | Great Britain. |

A. LOUIS MONACELL, *Primary Examiner.*

M. W. GREENSTEIN, *Assistant Examiner.*